(12) United States Patent
Passone

(10) Patent No.: US 10,501,127 B2
(45) Date of Patent: Dec. 10, 2019

(54) FRAMES FOR BUSES OR INDUSTRIAL TRANSPORT VEHICLES

(71) Applicant: BAOMARC AUTOMOTIVE SOLUTIONS S.P.A., Vinovo (Turin) (IT)

(72) Inventor: Pietro Passone, Vinovo (IT)

(73) Assignee: BAOMARC AUTOMOTIVE SOLUTIONS S.P.A., Vinovo (Turin) (IT)

(*) Notice: Subject to any disclaimer, the term of this patent is extended or adjusted under 35 U.S.C. 154(b) by 0 days.

(21) Appl. No.: 15/567,094

(22) PCT Filed: Apr. 26, 2016

(86) PCT No.: PCT/IB2016/053247
§ 371 (c)(1),
(2) Date: Oct. 17, 2017

(87) PCT Pub. No.: WO2016/174570
PCT Pub. Date: Nov. 3, 2016

(65) Prior Publication Data
US 2018/0099702 A1 Apr. 12, 2018

(30) Foreign Application Priority Data
Apr. 30, 2015 (IT) .................. 102015000013668

(51) Int. Cl.
| B60N 99/00 | (2006.01) |
| B62D 31/02 | (2006.01) |
| B62D 25/00 | (2006.01) |
| B62D 33/04 | (2006.01) |
| B62D 47/02 | (2006.01) |
| B62D 27/02 | (2006.01) |

(52) U.S. Cl.
CPC ............. *B62D 31/02* (2013.01); *B62D 25/00* (2013.01); *B62D 27/02* (2013.01); *B62D 33/04* (2013.01); *B62D 47/02* (2013.01)

(58) Field of Classification Search
CPC ........ B62D 31/02; B62D 25/00; B62D 27/02; B62D 33/04; B62D 47/02
See application file for complete search history.

(56) References Cited

U.S. PATENT DOCUMENTS

| 8,444,211 B2* | 5/2013 | Fujita ................... B62D 21/152 |
| | | 296/187.05 |
| 2009/0200823 A1* | 8/2009 | Vertanen ................... B60P 3/40 |
| | | 296/26.08 |

(Continued)

FOREIGN PATENT DOCUMENTS

| CN | 202358193 U | 8/2012 |
| CN | 103287509 A | 9/2013 |

(Continued)

*Primary Examiner* — Lori L Lyjak
(74) *Attorney, Agent, or Firm* — Meunier Carlin & Curfman LLC

(57) ABSTRACT

Frames for vehicles, such as buses or industrial transport vehicles, are provided which may be formed by a plurality of welded elements including ribs, cross members and uprights. At least one upright maybe formed by a first section bar welded to a second section bar, thereby forming a closed, hollow cross-section. Methods of making and using such frames are also provided.

12 Claims, 7 Drawing Sheets

(56) References Cited

U.S. PATENT DOCUMENTS

2010/0181804 A1\* 7/2010 Malvino .............. B62D 23/005
 296/205
2015/0224907 A1\* 8/2015 Holmgren ................ B60P 3/08
 414/482

FOREIGN PATENT DOCUMENTS

| DE | 19903724 A1 | 8/2000 |
| DE | 102007018183 A1 | 5/2008 |
| DE | 102010016474 A1 | 10/2011 |
| JP | 2010064669 A | 3/2010 |
| WO | 2014163203 A1 | 10/2014 |
| WO | 2015008739 A1 | 1/2015 |

\* cited by examiner

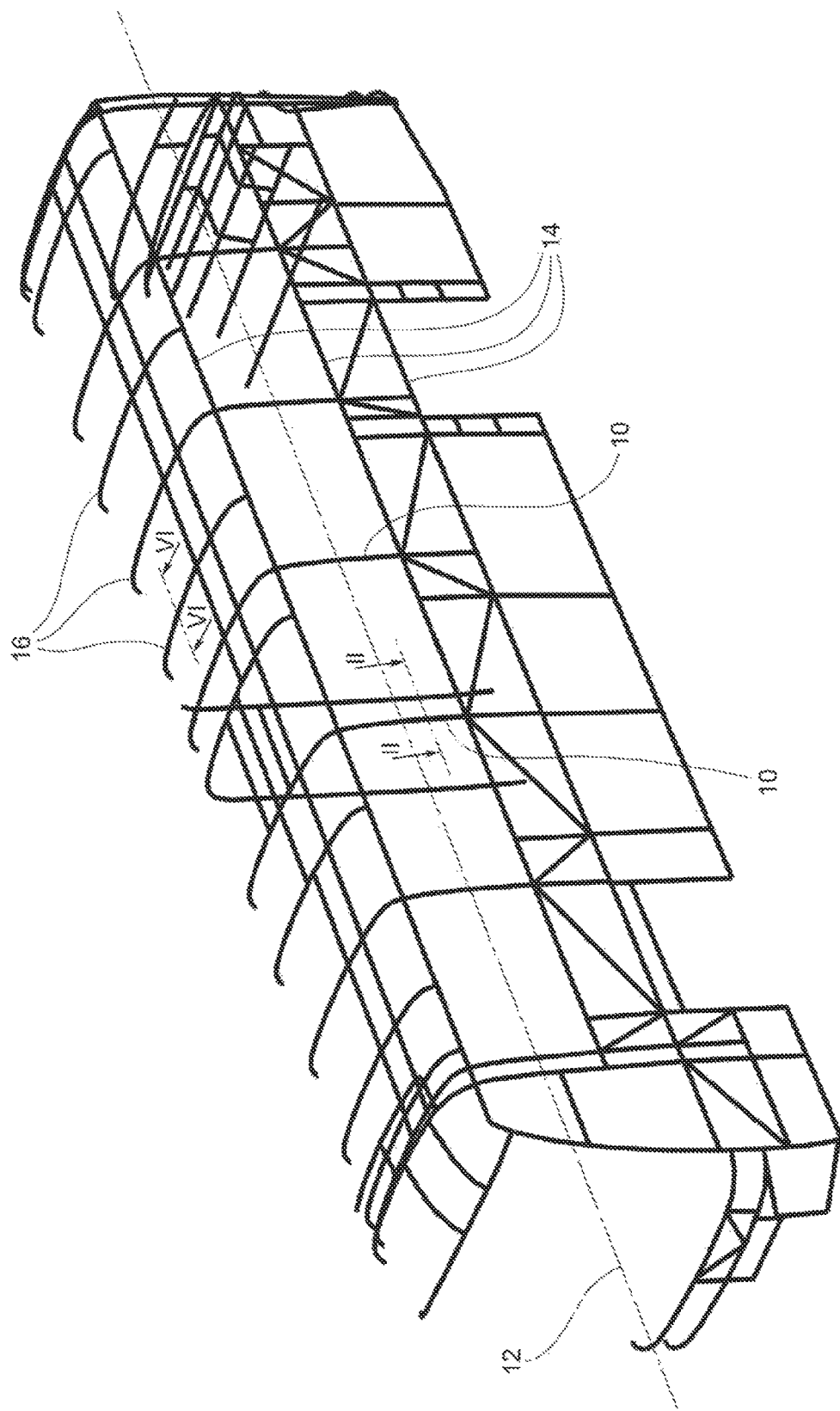

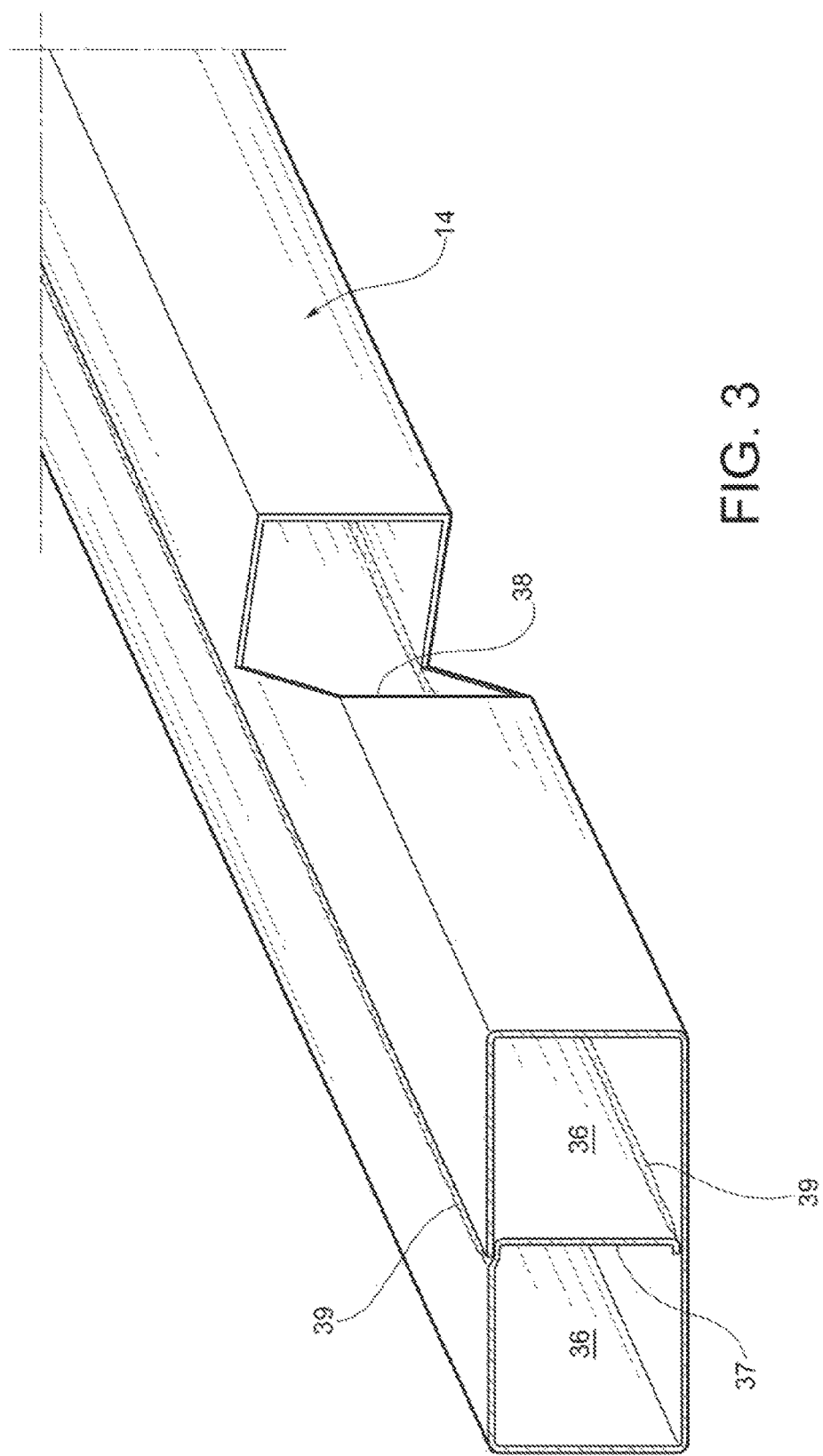

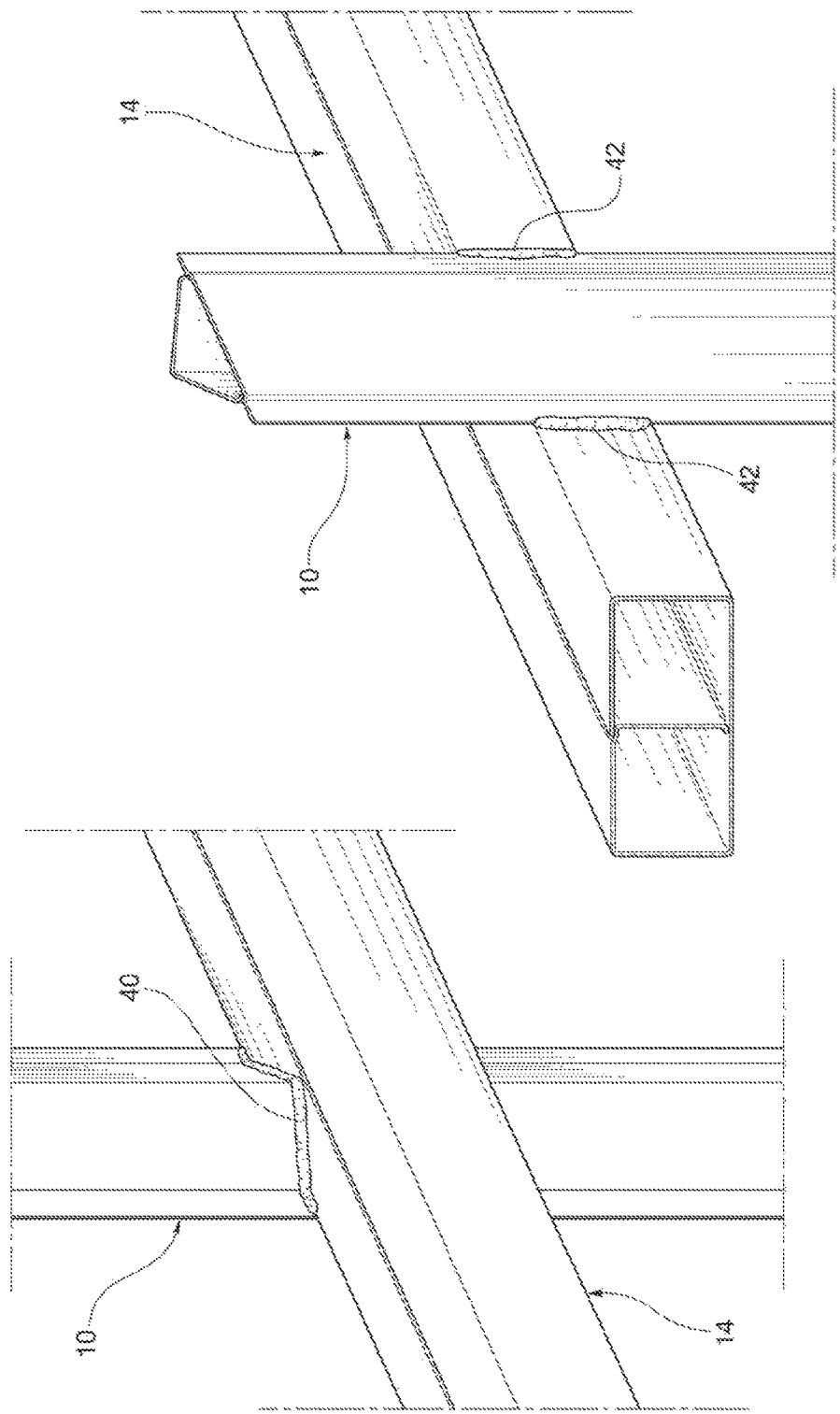

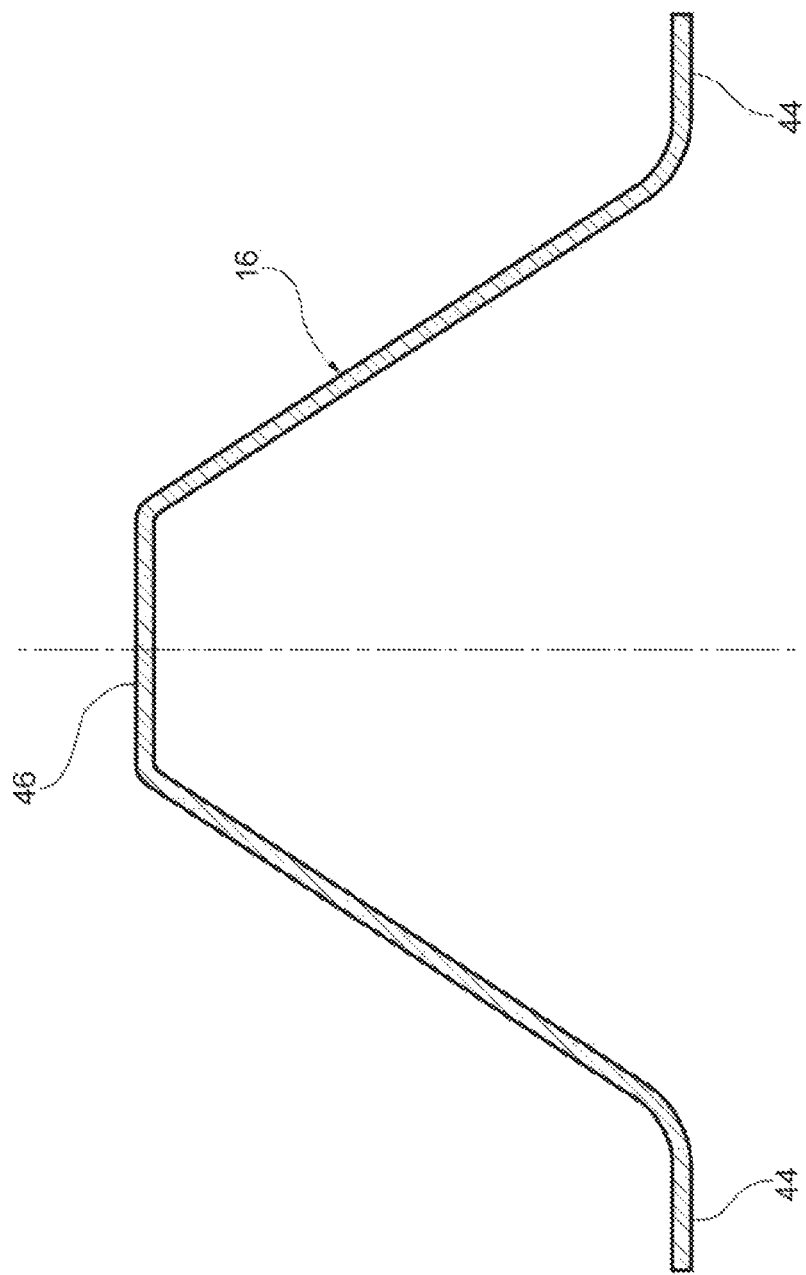

FRAMES FOR BUSES OR INDUSTRIAL TRANSPORT VEHICLES

CROSS-REFERENCE TO RELATED APPLICATIONS

This application is a National Phase Application of PCT International Application No. PCT/IB2016/052347, International Filing Date, Apr. 26, 2016, claiming priority to Italian Patent Application No. 102015000013668, filed Apr. 30, 2015 each of which is hereby incorporated by reference in its entirety.

FIELD OF THE INVENTION

The present invention relates to a frame of a vehicle, such as a bus or an industrial transport vehicle, formed by a plurality of elements welded together.

BACKGROUND OF THE INVENTION

In the prior art, such frames are made using substantially manual techniques by welding together, typically using an arc welder, elements including one-piece pipes, each of which can for example form an upright, rib or cross member.

SUMMARY OF THE INVENTION

One objective of the present invention is to provide an improved frame in relation to the frames described in the prior art, and that can in particular be made using industrial methods and that is lightweight.

According to the invention, this and other objectives are achieved using frames having the features described and claimed herein. In particular, in embodiments of the invention at least one of the elements making up the frame is an upright formed by a first section welded to a second section to form a hollow, closed cross-section. The first section may have a cross-section with a recessed centre portion and protruding end portions and the second section may have an open end inserted into said centre portion of the first section and an opposite closed end that is narrower than the width of the open end. Exemplary embodiments of frames according to the invention are described and claimed herein.

Forming each upright of the frame by joining together two sections, which may be made of different materials and be of different thicknesses, makes it possible to optimize the structure, making same suitable for specific usage requirements. For example, only one of the two sections (typically the one arranged on the inside, which is subject to greater stress) need be made of high or very-high strength steel and/or be of a conventional thickness, while the other section can be thinner and made of a different material, such as conventional steel. Naturally, two sections made of the same material and of the same thickness may be used, as may any other combination of materials and thicknesses be selected independently for each of the two sections. This helps to significantly reduce both the cost and the weight of the frame, without adversely affecting the performance of same.

Furthermore, the size of the cross section of the element can be appropriately reduced in relation to the size required when using a one-piece tube, which helps to further reduce overall weight.

Preferably, the other elements making up the frame, such as ribs and cross members, may also be made from a respective profiled element, for which the desired constituent material and cross section may be used, thereby enhancing the aforementioned advantages.

The greater flexibility provided in terms of choice of the cross section of each element of the frame also makes it possible to use shapes that facilitate the assembly of the different elements, for example using spot welding techniques in up to 90% of joints, and simplifying assembly on the frame of bodywork elements, windows, internal coverings, etc.

Consequently, the method for producing the frame and the vehicle as a whole can be streamlined and applied using industrial techniques, making same simpler and cheaper.

The present invention also relates to a bus or industrial transport vehicle with a frame of the type described above.

Further advantages and features of the present invention are presented in the detailed description below, and are provided as non-limiting examples with reference to the attached drawings.

BRIEF DESCRIPTION OF THE FIGURES

FIG. 1 is a schematic perspective view of a frame according to the invention,

FIG. 3 is a perspective view of a length of a cross member of the frame according to the invention, FIGS. 4 and 5 are respective perspective views from different angles of the upright and of the cross member in the previous figures, welded together, FIG. 6 is a cross-sectional view along the line VI-VI in FIG. 1 of a rib of the frame according to the invention.

DETAILED DESCRIPTION

A bus frame is formed (FIG. 1) by a plurality of elements welded together. In particular, such elements notably include uprights 10 that extend linearly along the sides of the frame substantially perpendicular to the horizontal plane containing the longitudinal axis 12 of the bus, cross members 14 that extend linearly and substantially parallel to the horizontal plane containing the axis 12, and arch-shaped ribs 16 that extend transversely across said axis 12, forming the roof and joining the uprights 10 located on opposing sides of the bus.

Figure 2A:
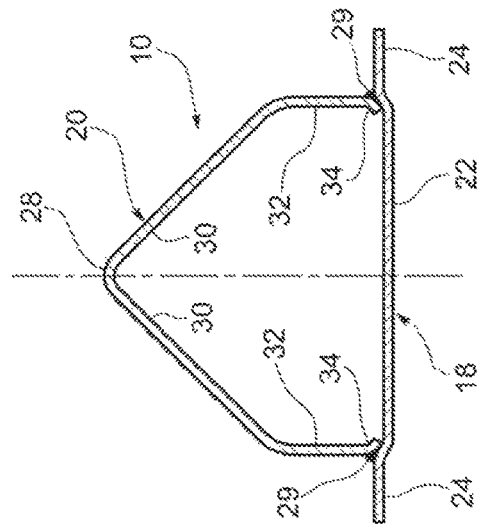
FIGS. 2a, 2b and 2c are cross-sectional views, along the line II-II in FIG. 1, of respective embodiments of an upright of the frame according to the invention.

Each upright 10 is formed (FIG. 2a) by a first section 18 welded to a second section 20, thereby as a whole forming a closed, hollow cross section. In particular, the first section 18 has a cross section with a recessed centre portion 22 and protruding end portions 24, while the second section has a substantially V-shaped cross section with inward folded ends 26 and an acute-angle vertex 28. The ends 26 of the second section 20 are welded into the central portion 22 of the first section 18 at the points indicated by reference sign 29.

Figure 2B:
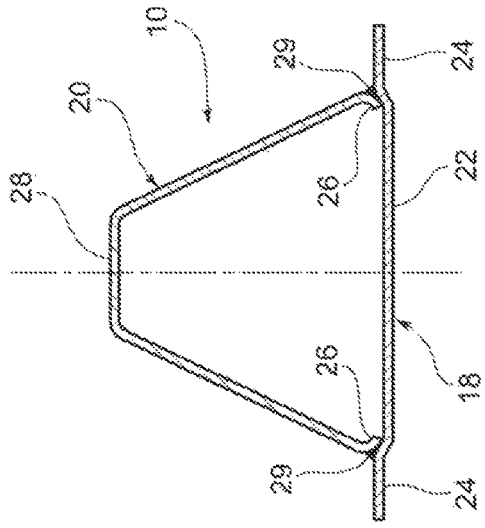
Figure 2C:
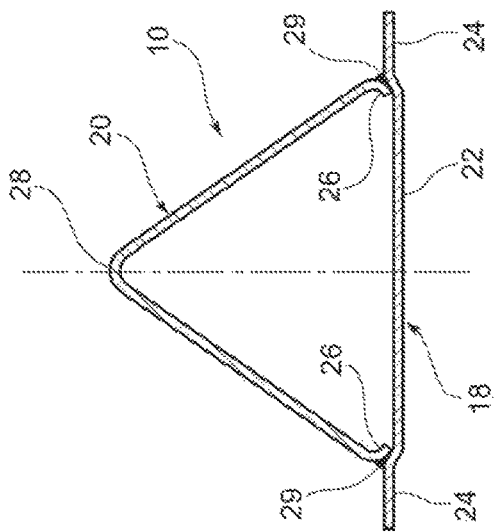

FIGS. 2b and 2c illustrate respective alternative embodiments of the cross section of the upright 10 in which the second section 20 in all cases has an open end with end portions welded into the central portion 22 of the first section 18, and an opposing closed end 28 that is narrower than the width of the open end, such that the section of the upright 10 is in all cases closed as a whole and tends to taper inwards.

In detail, in the embodiment shown in FIG. 2b, the second section 20 has a substantially V-shaped cross section with inward folded extremities 26 and a flattened vertex 28.

On the other hand, in the embodiment shown in FIG. 2c, the second section 20 has a cross section with a substantially V-shaped portion, the arms 30 of which lead to respective rectilinear lengths 32 that are substantially perpendicular to the first section 18, the ends 34 of which are folded inwards.

Each cross member 14 is formed (FIG. 3) by a third section with a cross section having two closed cavities 36 that are positioned side by side and have a polygon shape, in particular square or rectangular. The two cavities 36 are divided by an internal wall 37 welded at the ends 39 to the external wall. The cross member 14 also has side notches 38 substantially perpendicular to the horizontal plane containing the longitudinal axis 12 of the bus. In particular, the notches 38 are located at the crossing points with the uprights 10 and the cross section of the former fits the cross section of the latter. Consequently, once (FIGS. 4 and 5) a respective length of the upright 10 has been inserted into the notch 38, the two parts 10, 14 can be welded together using welds extending either parallel 40 or transversely 42 in relation to the horizontal plane containing the longitudinal axis 12.

Each rib 16 is generally arch-shaped and is formed by a fourth section with (FIG. 6) a substantially V-shaped cross section with outward folded ends 44 and a flattened vertex 46.

Figure 7:
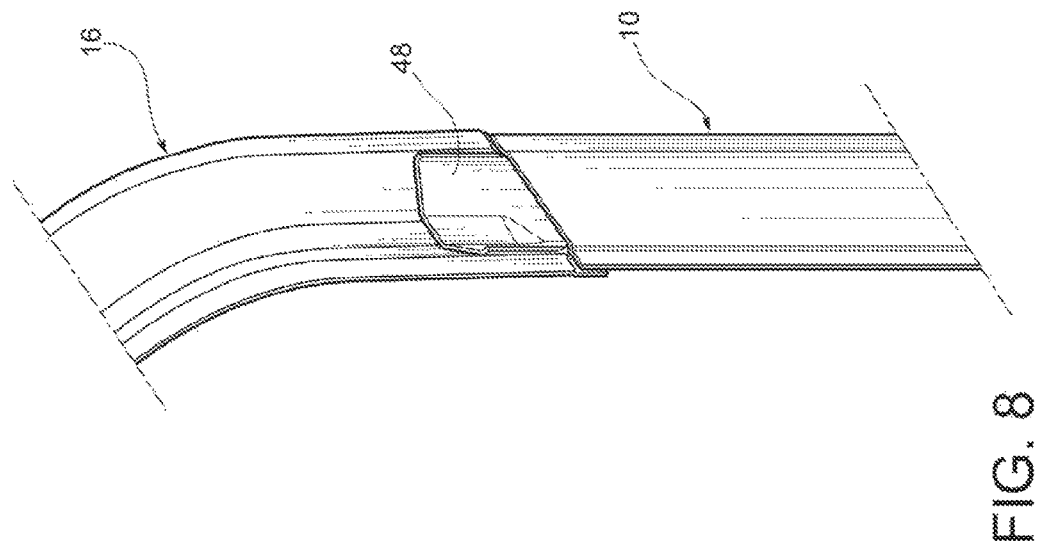
FIGS. 7 and 8 are respective perspective views showing the coupling of an upright and a rib from the previous figures.
Figure 8:
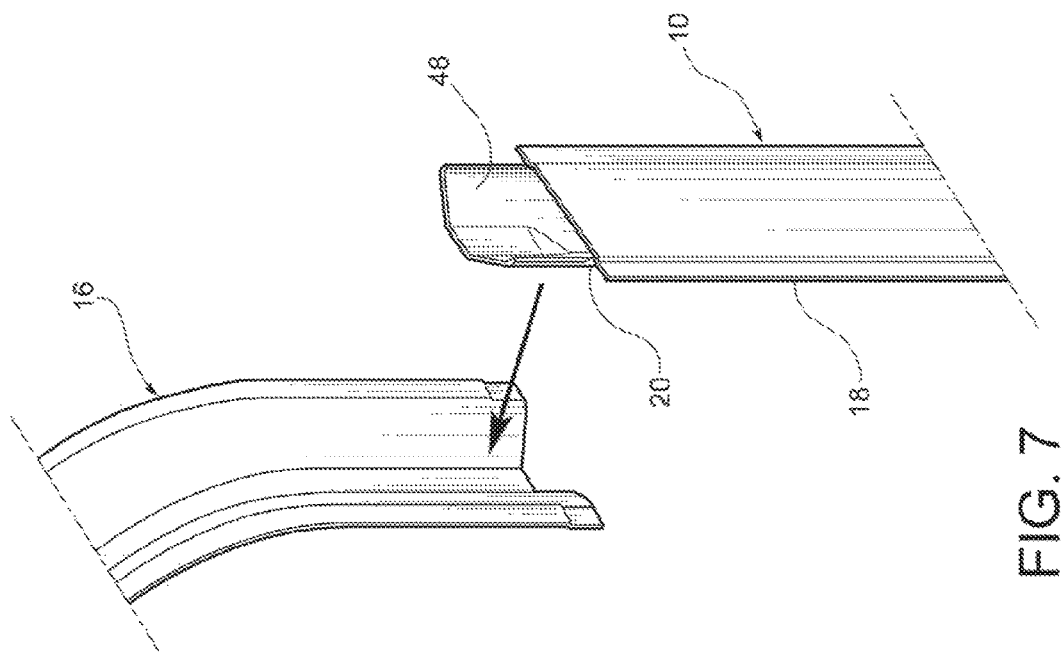

As shown in FIGS. 7 and 8, at each top end of the uprights 10, the second section 20 has a length 48 protruding beyond the first section 18. The length 48 may be inserted into a lower end of the rib 16. The portions of said ends that are in contact are then welded together, thereby attaching the rib 16 to the upright 10 extending up one side of the frame. Naturally, the other lower end of the rib 16 can be similarly welded to an upright 10 extending up the opposite side of the frame.

Figure 11:
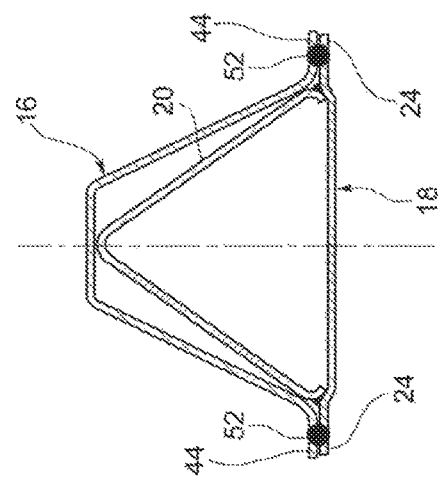
Figure 10:
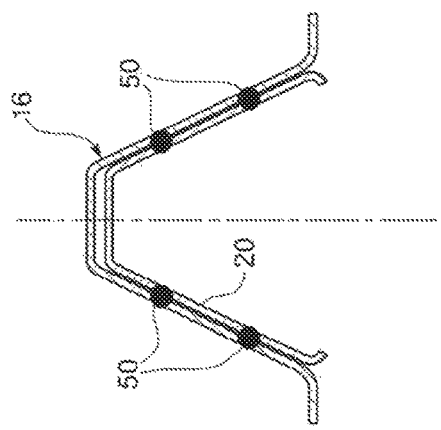
Figure 9:
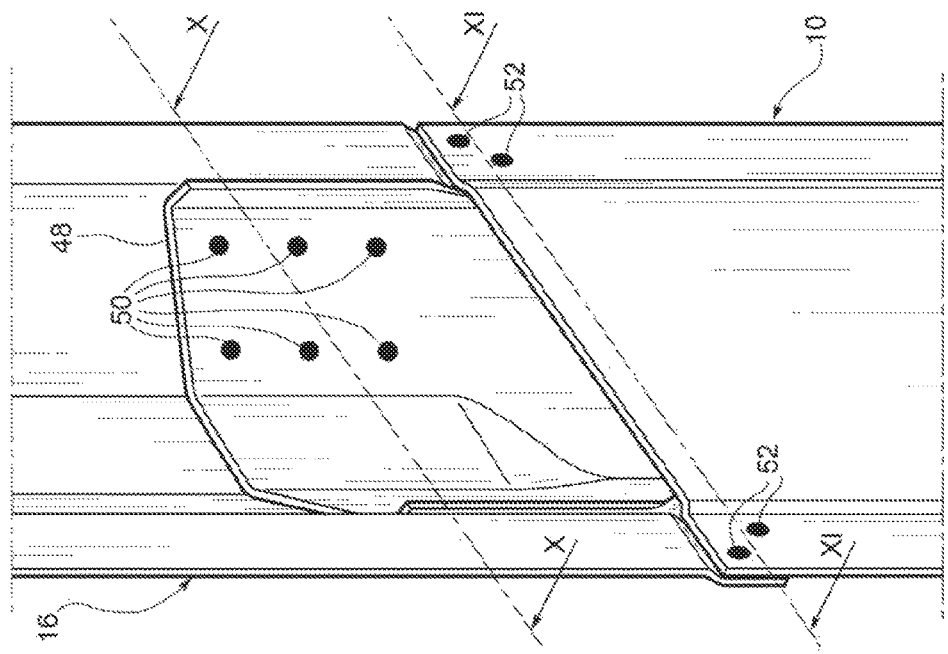
FIG. 9 is a magnification of a detail from FIG. 8, and FIGS. 10 and 11 are cross-sectional views along the lines X-X and XI-XI respectively in FIG. 9.

FIGS. 9, 10 and 11 show in detail the positioning of the spot welds: in particular, there are spot welds 50 between the arms respectively in contact with the V-section portions of the protruding length 48 of the second section 20 of the upright 10 and of the rib 16, as well as spot welds 52 between the end portions 24 of the first section 18 of the upright 10 and the outward folded ends 44 of the rib 16.

It should also be noted that the protruding portions of the elements described above, such as the end portions 24 of the first section 18 of the uprights 10 and the outward folded ends 44 of the arms of the ribs 16, significantly facilitate the assembly on the frame of additional components of the bus, such as bodywork components, windows, internal coverings, etc., without in principle requiring any additional work. Indeed, the presence of these protruding portions can be determined when the sections are being shaped, which must in all cases be done to ensure same have the shape required to satisfy the remaining usage requirements.

Implementation details and particular embodiments may be varied from the description without thereby departing from the scope of the invention as described and claimed herein. For example, in a given frame, all of the uprights, cross members and ribs may have the same respective section and be made of the same material, or the most appropriate section and material for each of these elements could be selected independently. It is also possible that some or all of the elements making up the frame may be made from sections while the remaining elements may be conventional elements, such as tubes.

The invention claimed is:

1. A frame for a vehicle comprising a plurality of welded elements, wherein at least one of said welded elements is an upright comprising a first section welded to a second section to form a hollow, closed cross-section, and wherein said first section comprises a cross-section with a recessed center portion and protruding end portions and said second section has an open end inserted into said center portion of the first section and an opposite closed end that is narrower than the width of the open end.

2. The frame of claim 1, wherein said second section has a substantially V-shaped cross-section with inward folded ends, and a flattened or acute-angled vertex.

3. The frame of claim 1, wherein said second section has a cross-section with a substantially V-shaped portion, the V-shaped portion having arms which lead to respective rectilinear lengths that are substantially perpendicular to ends of the first section which are folded inwards.

4. The frame of claim 1, further comprising at least one cross member formed by a third section, having a cross-section with two closed cavities positioned side-by-side.

5. The frame of claim 4, wherein said closed cavities have a polygonal shape.

6. The frame of claim 4, wherein said cross member comprises at least one side notch, within which said upright is welded.

7. The frame of claim 4, further comprising at least one rib formed by a fourth section, having a substantially V-shaped cross-section with outward folded ends and a flattened vertex.

8. The frame of claim 7, wherein at an upper end of said upright the second section has a length protruding from the first section that is inserted into a lower end of said rib, said ends of the upright and the rib being joined by spot welds.

9. The frame of claim 1, wherein said welded elements are selected from a group consisting of: uprights, cross members and ribs, each upright being formed by two sections welded together and each cross member and rib being formed by a respective single section.

10. The frame of claim 1, wherein said first section and said second section are made from different materials.

11. A bus or industrial transport vehicle comprising the frame of claim 1.

12. The frame of claim 1, wherein said first section and said second section are of different thicknesses.

* * * * *